United States Patent
Baba et al.

(10) Patent No.: US 10,348,149 B2
(45) Date of Patent: Jul. 9, 2019

(54) STATOR FOR ROTATING ELECTRIC MACHINE AND ROTATING ELECTRIC MACHINE INCLUDING THE STATOR

(71) Applicant: HITACHI AUTOMOTIVE SYSTEMS, LTD., Hitachinaka-shi, Ibaraki (JP)

(72) Inventors: Yuichiro Baba, Hitachinaka (JP); Takashi Ishigami, Tokyo (JP); Ryoji Kobayashi, Hitachinaka (JP); Manabu Oshida, Hitachinaka (JP); Satoshi Yamamura, Hitachinaka (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 235 days.

(21) Appl. No.: 15/515,030

(22) PCT Filed: Aug. 19, 2015

(86) PCT No.: PCT/JP2015/073170
§ 371 (c)(1),
(2) Date: Mar. 28, 2017

(87) PCT Pub. No.: WO2016/051978
PCT Pub. Date: Apr. 7, 2016

(65) Prior Publication Data
US 2017/0214287 A1    Jul. 27, 2017

(30) Foreign Application Priority Data

Sep. 29, 2014   (JP) ................................. 2014-197746

(51) Int. Cl.
*H02K 3/28*   (2006.01)
*H02K 3/52*   (2006.01)
(Continued)

(52) U.S. Cl.
CPC ................. *H02K 3/28* (2013.01); *H02K 3/18* (2013.01); *H02K 3/522* (2013.01); *H02K 5/225* (2013.01); *H02K 2203/06* (2013.01)

(58) Field of Classification Search
CPC   H02K 3/28; H02K 3/18; H02K 3/522; H02K 3/225; H02K 2203/06
(Continued)

(56) References Cited

U.S. PATENT DOCUMENTS 7,626,294 B2 *  12/2009  Ohta ...................... H02K 1/148
                                                        310/194
8,269,387 B2 *   9/2012  Endo ...................... H02K 3/522
                                                        310/194
(Continued)

FOREIGN PATENT DOCUMENTS

JP   2008-187875 A   8/2008
JP   2009-219343 A   9/2009
(Continued)

OTHER PUBLICATIONS

International Search Report, PCT/JP2015/073170, dated Nov. 24, 2015, 1 pg.

*Primary Examiner* — Burton S Mullins
(74) *Attorney, Agent, or Firm* — Volpe and Koenig, P.C.

(57) ABSTRACT

A stator for a rotating electric machine facilitates the assembly of the stator coils and restricts its length in the axial direction. The stator includes a stator iron core having a plurality of teeth and a plurality of stator coils each being wound on one of the teeth. The stator coils include terminal stator coils, each having a crossover wire and a lead wire. Each crossover wire is connected to one of the stator coils of the same phase and each lead wire being is connected to an object other than the stator coils of the same phase. Each end of the crossover wires and the lead wires is disposed at a different level; a first level being the closest to the stator (Continued)

iron core. At least one of the lead wires of the terminal stator coils is disposed at least one level apart within the range of levels.

13 Claims, 11 Drawing Sheets

(51) Int. Cl.
*H02K 3/18* (2006.01)
*H02K 5/22* (2006.01)

(58) Field of Classification Search
USPC .................................. 310/71, 179, 180, 184
See application file for complete search history.

(56) References Cited

U.S. PATENT DOCUMENTS

| | | | |
|---|---|---|---|
| 8,294,324 B2* | 10/2012 | Ishigami | H02K 3/12 310/206 |
| 8,384,258 B2* | 2/2013 | Koike | H02K 3/12 310/260 |
| 8,497,618 B2* | 7/2013 | Kato | H02K 3/522 310/194 |
| 8,749,107 B2* | 6/2014 | Trammell | H02K 3/50 310/215 |
| 8,760,019 B2* | 6/2014 | Mori | H02K 3/28 310/184 |
| 8,939,803 B2* | 1/2015 | Nakamura | H02K 3/522 439/877 |
| 8,941,275 B2* | 1/2015 | Genda | B60K 1/02 310/71 |
| 9,325,213 B2* | 4/2016 | Egami | H02K 5/225 |
| 9,419,491 B2* | 8/2016 | Egami | H02K 3/50 |
| 2009/0001841 A1* | 1/2009 | Naganawa | H02K 3/12 310/207 |
| 2009/0200888 A1 | 8/2009 | Tanaka et al. | |
| 2013/0221781 A1* | 8/2013 | Nakayama | H02K 1/185 310/89 |
| 2013/0270973 A1* | 10/2013 | Ikemoto | H02K 11/25 310/68 C |
| 2015/0022047 A1* | 1/2015 | Shibata | H02K 3/28 310/208 |
| 2015/0042190 A1 | 2/2015 | Nagumo | |
| 2015/0123503 A1* | 5/2015 | Hashimoto | H02K 3/18 310/71 |
| 2016/0190884 A1* | 6/2016 | Nakamura | H02K 3/12 310/208 |
| 2017/0117767 A1* | 4/2017 | Ishigami | H02K 1/16 |

FOREIGN PATENT DOCUMENTS

| | | |
|---|---|---|
| JP | 2014-011937 A | 1/2014 |
| WO | 2013/146401 A1 | 10/2013 |

\* cited by examiner

STATOR FOR ROTATING ELECTRIC MACHINE AND ROTATING ELECTRIC MACHINE INCLUDING THE STATOR

TECHNICAL FIELD

The present invention relates to a stator for a rotating electric machine and a rotating electric machine including the stator.

BACKGROUND ART

In the background arts of the present technical field, there is known a rotating electric machine that restricts the height of a coil end to reduce the height of the coil end (See PTL 1, for example). PTL 1 discloses "a rotating electric machine including a structure for connecting coil terminals in which each first coil having an inner coil terminal extending from the inner side of a slot in the direction of the coil end of a stator coil is connected to a second coil having an outer coil terminal extending from the outer side of the slot in the direction of the coil end of the stator coil by connecting the inner coil terminal to the outer coil terminal across the coil end, and the connected terminals are bent toward the coil end."

There is also known a stator that reduces its size in the direction of the central axis (See PTL 2, for example). PTL 2 discloses "a stator in which the bas bar portion is formed so that a longitudinal direction of a rectangular cross-section of the rectangular conductor extends perpendicularly to a direction of a central axis of the stator iron core, the terminal portion is formed so that a longitudinal direction of a rectangular cross-section of the rectangular conductor extends perpendicularly to a direction of a central axis of the stator iron core, and the bas bar portion is jointed to the terminal portion of a different one of the coils."

CITATION LIST

Patent Literatures

PTL 1: JP 2009-219343 A
PTL 2: JP 2014-11937 A

SUMMARY OF INVENTION

Technical Problem

PTL 1 discloses a technique that restricts the height of a coil end to reduce the height of the coil end. In the technique of PTL 1, the pre-wound coils are mounted in the respective slots in the stator iron core from the inside of the stator iron core, the outer conductor terminals are curled along the coil end to the inner conductor terminals, and after the completion of the connection of the conductor terminals, the connected terminals are bent in the outward radial direction from the coil end. This technique needs post-forming of the coils after the insertion of the coils, which may complicate the work process.

In the technique of PTL 2, the bas bar portion is disposed very closely to the stator iron core to reduce the height of the bas bar portion in the direction of the central axis of the stator iron core. Although PTL 2 does not disclose any specific means for connecting the inner end of the U-phase coil, the inner end of the V-phase coil, and the inner end of the W-phase coil to form a neutral point, it is obvious from FIG. 1 of PTL 2, for example, that the connection of the inner end of the U-phase coil, the inner end of the V-phase coil, and the inner end of the W-phase coil to form a neutral point is assumed to take place over the coil end. In that case, it is necessary to do the connection while protecting the coil end, which may complicate the work process.

An object of the present invention is to provide a stator for a rotating electric machine that facilitates the assembly of stator coils and restricts its length in the axial direction, and a rotating electric machine including the stator.

Solution to Problem

To solve the above problems, the present invention adopts the structures defined in the claims, for example.

The present application includes a plurality of means for solving the above problems, and for example, a stator for a rotating electric machine includes: a stator iron core including a plurality of teeth; and a plurality of stator coils each being wound on one of the teeth, wherein the stator coils include terminal stator coils each having a crossover wire and a lead wire, each crossover wire being to be connected to one of the stator coils of the same phase and each lead wire being to be connected to an object other than the stator coils of the same phase, wherein each end of the crossover wires and the lead wires is disposed at one of different levels in the axial direction of the stator iron core, a first level of the different levels being the closest to the stator iron core, and wherein at least one of the lead wires of the terminal stator coils is disposed at least one level apart within the range of the different levels.

Advantageous Effects of Invention

In a rotating electric machine in which stator coils are mounted on a stator iron core from the inside close to the central axis of the stator iron core, the lead wires of the stator coils can be disposed in the outward direction of the stator iron core (to extend beyond the coil end) only by inserting the stator coils from the inside close to the central axis of the stator iron core, which facilitates the connection between the lead wires or the connection of the lead wires with external terminals. In addition, the lead wires can be disposed as low as possible in the axial direction, which reduces the size of the motor in the axial direction.

Problems to be solved, structures, and advantageous effects other than the above will be clarified in the following description of the embodiments of the present invention.

DESCRIPTION OF EMBODIMENTS

Figure 1:
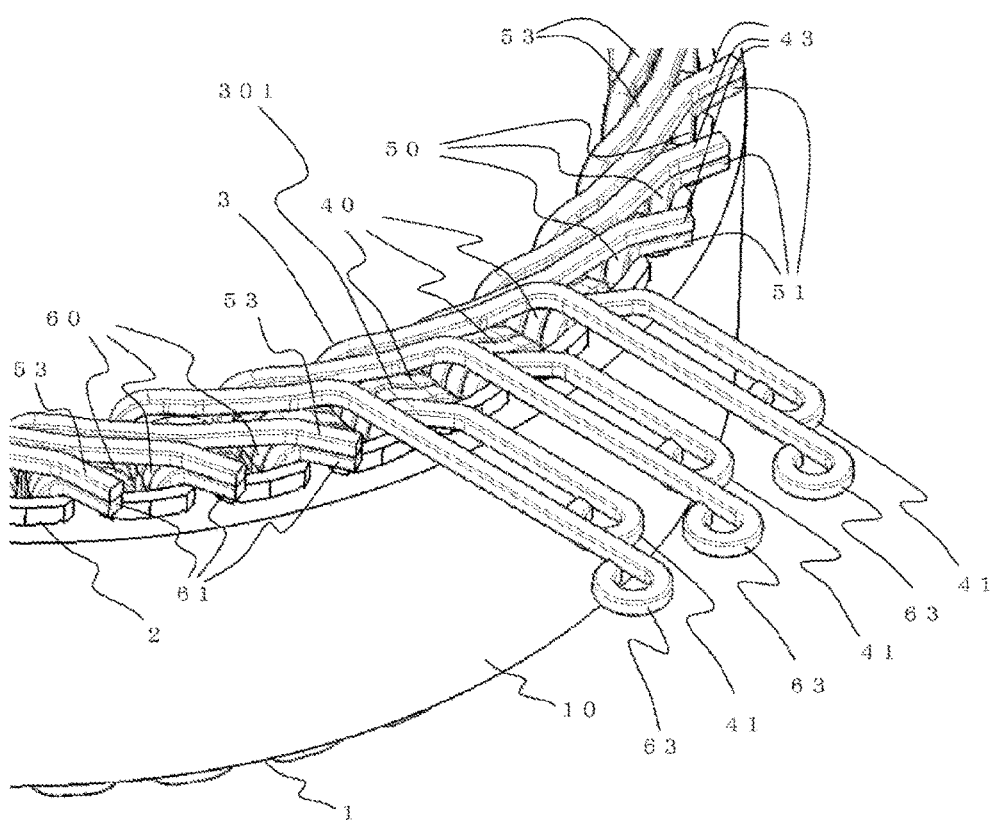
FIG. 1 is a perspective view of a part of a stator ASSY (Embodiment 1).

The embodiments of the present invention will be described below with reference to the accompanying drawings. The same reference numerals are used for the same structural elements in the drawings.

Embodiment 1

A stator ASSY 1 for a rotating electric machine will first be described with reference to FIGS. 1 to 6 and FIG. 14. FIG. 1 is a perspective view of the stator ASSY 1 for a rotating electric machine according to Embodiment 1 of the present invention.

The stator ASSY 1 includes a stator iron core 10 and a plurality of stator coils 3.

The stator iron core 10 is made of a stack of flat rolled magnetic steel sheets. Each of the flat rolled magnetic steel sheets has a ring shape made by punching or etching and a thickness in the range of approximately 0.05 to 1.0 mm. The stator iron core is generally cylindrical and includes a yoke constituting the outer part, and a plurality of teeth projecting from the inner side of the yoke in the inward radial direction. The teeth are disposed on the inner side of the yoke at regular intervals in the circumferential direction. The stator iron core is of a full-open-slot type having generally straight teeth and is convenient for mounting the stator coils from the inside of the stator iron core.

An insulating member 2 is attached to the teeth (or the slots) of the stator iron core. The insulating member 2 is made of a bobbin of insulating resin, or insulating paper. The insulating member 2 is open inside like the stator iron core and is convenient for mounting the stator coils from the inside of the stator iron core.

The intensively wound stator coils 3 are mounted on the teeth from the inside of the stator iron core. The stator ASSY 1 is a three-phase-current rotating electric machine and has 24 poles and 36 slots. The stator ASSY 1 thus has 36 teeth and includes the stator coils of three different phases (a U phase, a V phase, and a W phase). In the stator ASSY 1, the stator coils (terminal A stator coils 40, intermediate stator coils 50, and terminal B stator coils 60 described below) of the same phase are mounted on different teeth and connected with each other in series.

Figure 14:
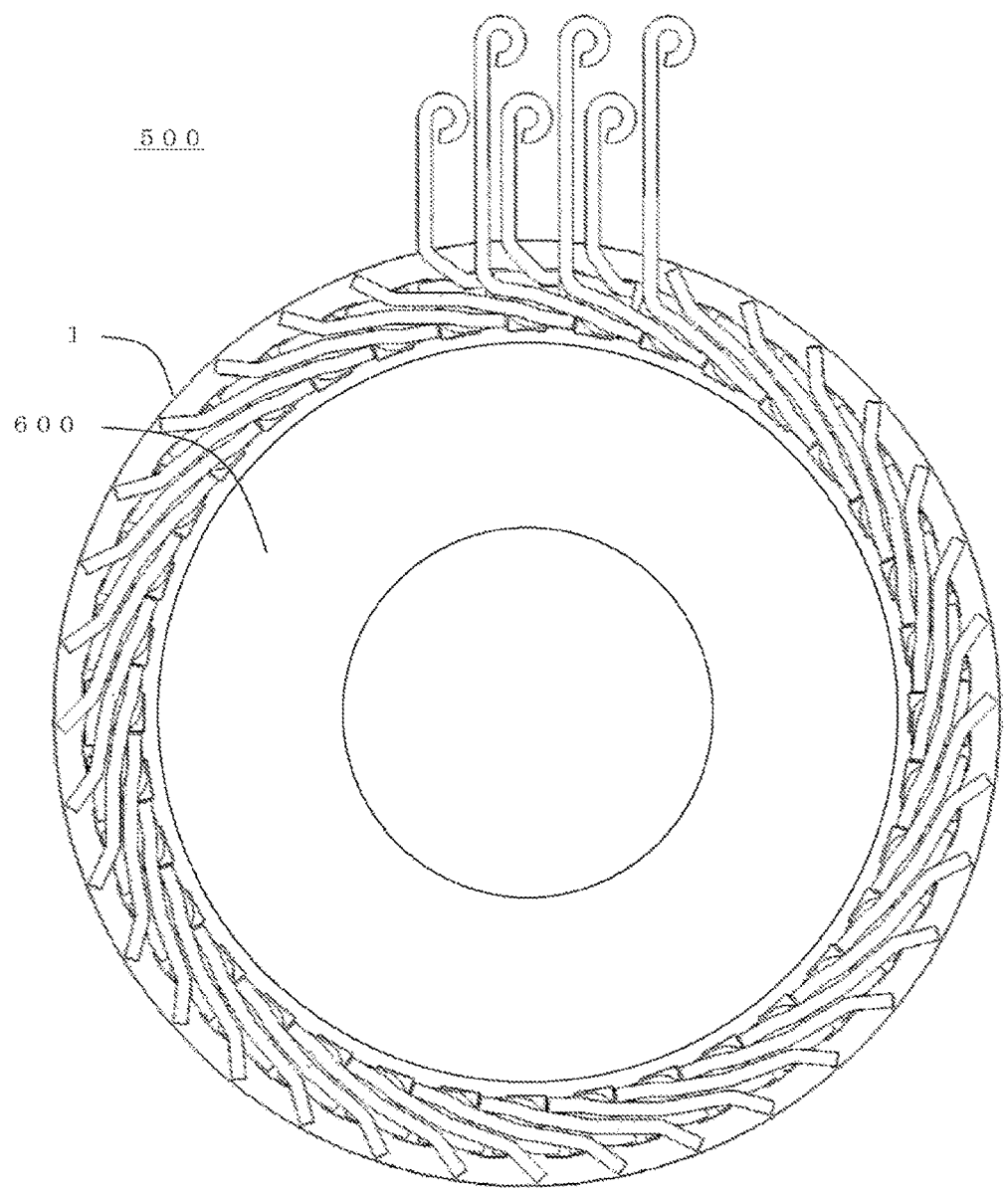
FIG. 14 is a view of a rotating electric machine.

As illustrated in FIG. 14, a rotor 600 is rotatably disposed inside the stator iron core with a gap. The stator iron core, the rotor, and the gap make a magnetic circuit of a rotating electric machine 500.

The stator coils of one phase (a U phase, for example) will now be described in detail with reference to FIGS. 2 to 5.

Figure 2:
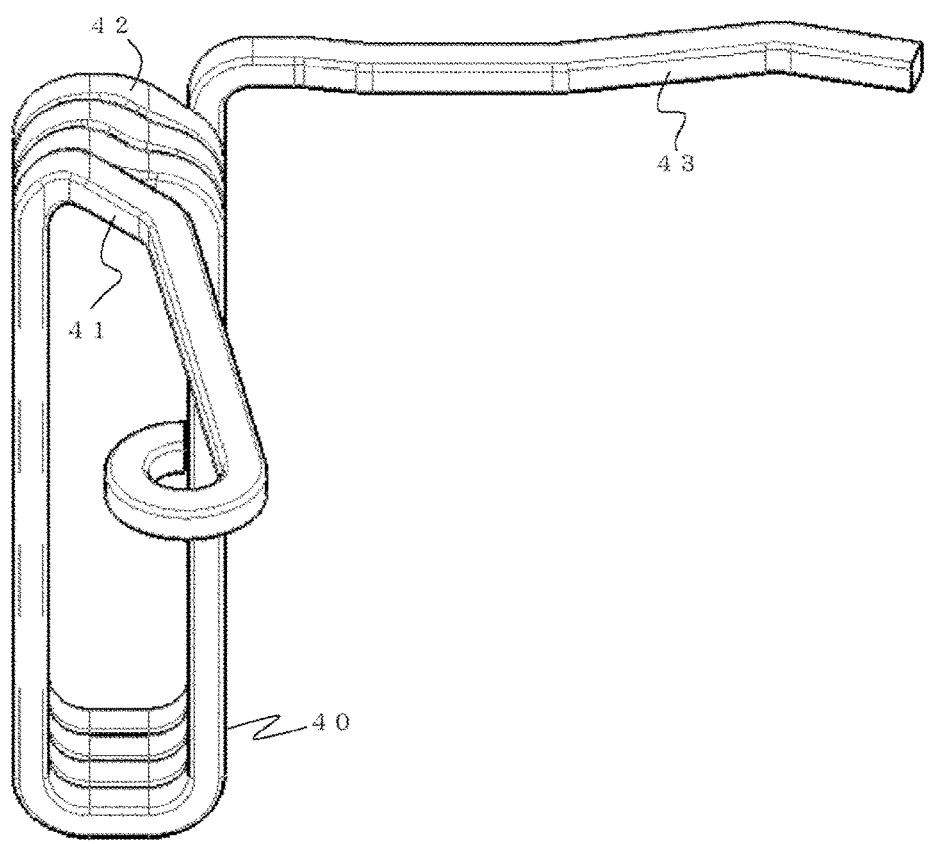
FIG. 2 is a view of a terminal A stator coil (Embodiment 1).

FIG. 2 illustrates a terminal A stator coil 40. The terminal A stator coil 40 includes a starting terminal 41 to be connected to an object other than a stator coil of the same phase, a wound portion 42 formed to fit to a tooth of the stator iron core, and an ending terminal 43 to be connected to a stator coil of the same phase across a stator coil of a different phase (a V phase or a W phase, for example). The terminal A stator coil 40 is wound from the starting terminal 41 to the ending terminal 43.

The ending terminal 43 of the terminal A stator coil is preformed to overlap with the starting terminal of a different stator coil in the axial direction of the stator iron core when the terminal A stator coil is mounted on the stator iron core.

The starting terminal 41 of the terminal A stator coil is formed to be on the same level with the wound portion 42 of the stator coil or slightly remoter from the stator iron core than the wound portion 42 of the stator coil in the axial direction of the stator iron core. The ending terminal 43 is formed to be remoter from the stator iron core than the starting terminal 41 and the wound portion 42 in the axial direction of the stator iron core.

The end of the starting terminal 41 has a circular form for facilitating the connection with a coil of a different phase or an external terminal. For example, a bolt can be inserted in the circular end.

Figure 3:
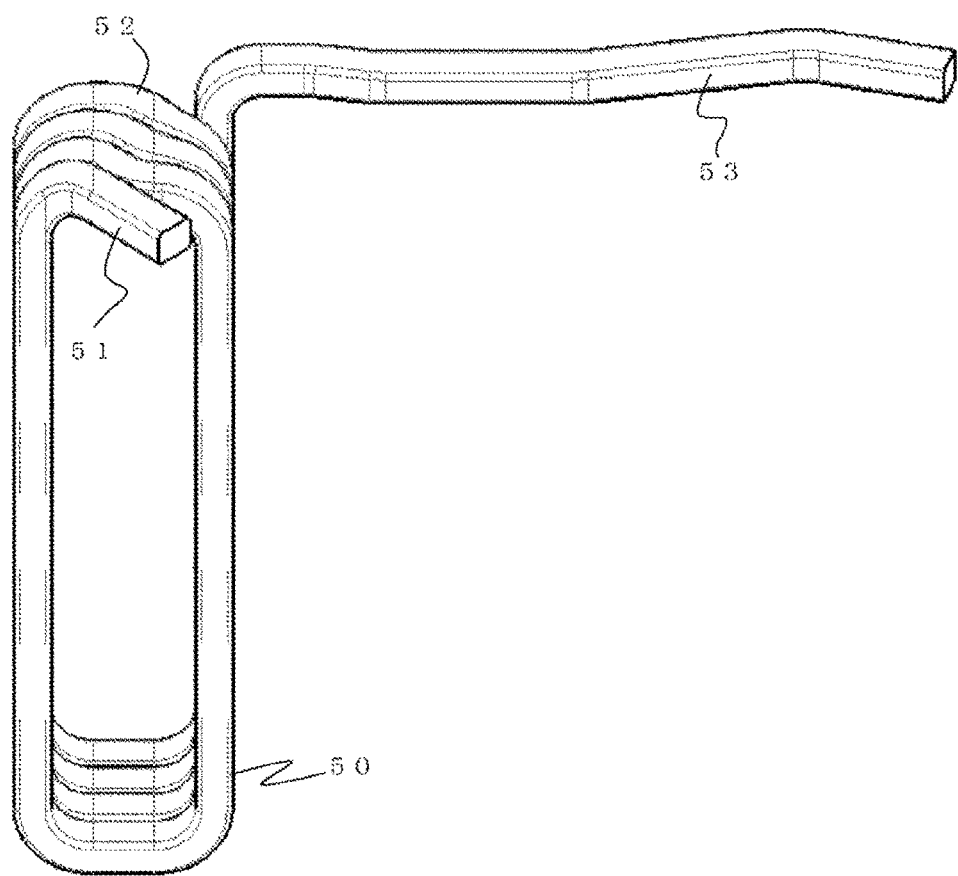
FIG. 3 is a view of an intermediate stator coil (Embodiment 1).

FIG. 3 illustrates an intermediate stator coil 50. The intermediate stator coil 50 includes a starting terminal 51 to be connected to a stator coil of the same phase, a wound portion 52 formed to fit to a tooth of the stator iron core, and an ending terminal 53 to be connected to a stator coil of the same phase across a stator coil of a different phase (a V phase or a W phase, for example). The intermediate stator coil 50 is wound from the starting terminal 51 to the ending terminal 53.

The ending terminal of the intermediate stator coil is preformed to overlap with the starting terminal of a different stator coil in the axial direction of the stator iron core when the intermediate coil is mounted on the stator iron core.

The starting terminal 51 of the intermediate stator coil is formed to be on the same level with the wound portion 52 of the stator coil or slightly remoter from the stator iron core than the wound portion 52 of the stator coil in the axial direction of the stator iron core. The ending terminal 53 is formed to be remoter from the stator iron core than the starting terminal 51 and the wound portion 52 in the axial direction of the stator iron core.

Figure 4:
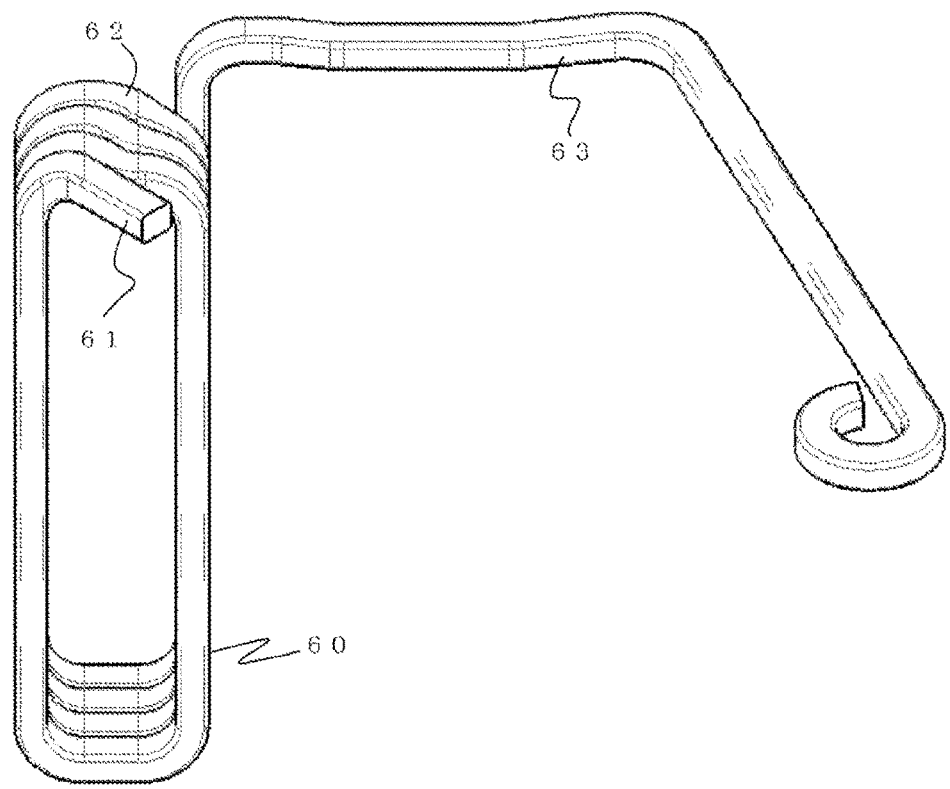
FIG. 4 is a view of a terminal B stator coil (Embodiment

FIG. 4 illustrates a terminal B stator coil 60. The terminal B stator coil 60 includes a starting terminal 61 to be connected to a stator coil of the same phase, a wound portion 62 formed to fit to a tooth of the stator iron core, and an ending terminal 63 to be connected to an object other than a stator coil of the same phase across a stator coil of a different phase (a V phase or a W phase, for example). The terminal B stator coil 60 is wound from the starting terminal 61 to the ending terminal 63.

The starting terminal 61 of the terminal B stator coil is formed to be on the same level with the wound portion 62 of the stator coil or slightly remoter from the stator iron core than the wound portion 62 of the stator coil in the axial direction of the stator iron core. The ending terminal 63 is formed to be remoter from the stator iron core than the ending terminal 43 of a terminal A stator coil in the axial direction of the stator iron core.

The starting terminal 41 of the terminal A stator coil 40 is long enough to be disposed in the outward direction of the stator iron core for facilitating the connection with a stator coil of a different phase or the connection with an external power source. In this embodiment, the starting terminal 41 is long enough to extend beyond the outer circumference of the stator iron core.

The ending terminal 63 of the terminal B stator coil 60 is long enough to be disposed beyond the coil end in the outward direction of the stator iron core for facilitating the connection with a stator coil of a different phase or the connection with an external power source. In this embodiment, the ending terminal 63 is long enough to extend beyond the outer circumference of the stator iron core.

The end of the starting terminal 41 and the end of the ending terminal 63 have circular forms for facilitating the connection with coils of different phases or external terminals. For example, bolts can be inserted in the circular ends.

Figure 5:
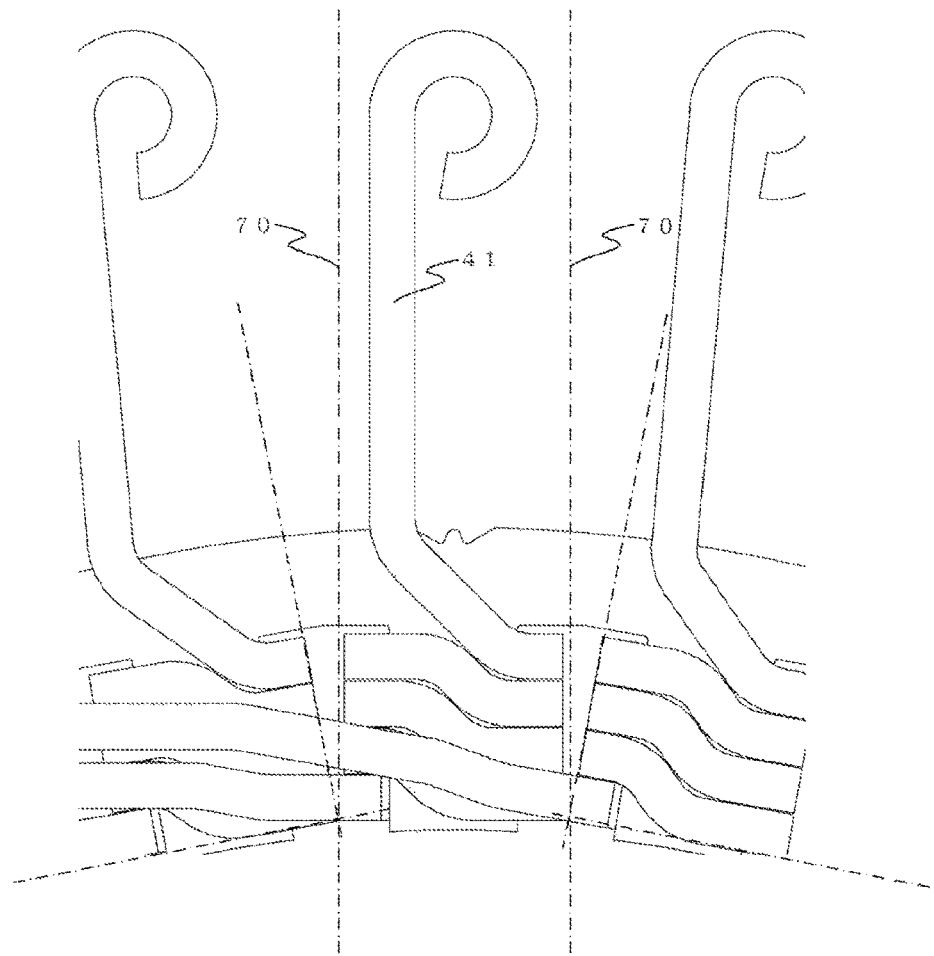
FIG. 5 is a view of a starting terminal of a terminal A stator coil (Embodiment 1).

As illustrated in FIG. 5, the starting terminal 41 of a terminal A stator coil is disposed between two virtual lines 70. Each of the virtual lines 70 is drawn from the point of intersection of the side line and the bottom line of one of the adjacent stator coils in the direction of insertion of the terminal A stator coil 40 into a tooth.

The starting terminal 51 of an intermediate stator coil and the starting terminal 61 of a terminal B stator coil are also disposed between two virtual lines 70 each of which is drawn from the point of intersection of the side line and the bottom line of one of the adjacent stator coils in the direction of insertion of the terminal A stator coil 40 as in the starting terminal 41 of the terminal A stator coil illustrated in FIG. 5. Even if the starting terminals 41, 51, and 61 of the stator coils are formed to be on the same level with the wound portions 42, 52, and 62 of the stator coils, the above positioning of the starting terminals of the stator coils allows the stator coils to be mounted on the teeth of the stator iron core while preventing the starting terminals 41, 51, and 61 of the stator coils from coming into contact with the adjacent stator coils, which reduces the size of the rotating electric machine.

Figure 6:
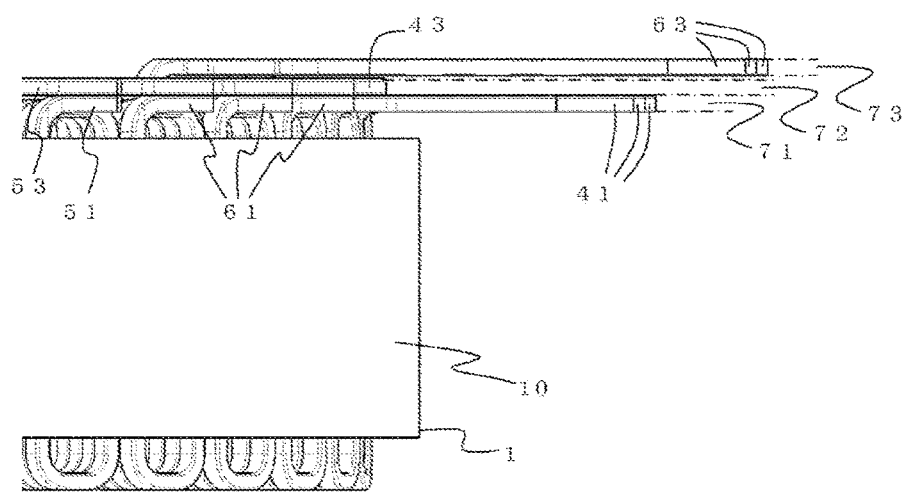
FIG. 6 is a side view of a part of the stator ASSY (Embodiment 1).

The arrangement of the stator coils of the stator ASSY will now be described with reference to FIG. 6.

The starting terminal 41 of a terminal A stator coil, the starting terminal 51 of an intermediate stator coil, and the starting terminal 61 of a terminal B stator coil are disposed at a first level 71 in the axial direction of the stator iron core.

The ending terminal 43 of the terminal A stator coil and the ending terminal 53 of the intermediate stator coil are disposed at a second level 72 in the axial direction of the stator iron core. The second level 72 does not share space with the first level 71 and is remoter from the stator iron core than the first level 71 in the axial direction of the stator iron core.

The ending terminal 63 of the terminal B stator coil is disposed at a third level 73. The third level 73 is remoter from the stator iron core than the second level 72 in the axial direction of the stator iron core.

In the stator ASSY 1, each of the terminals of the stator coils belongs to one of the three different levels: the first level 71 for the starting terminals 41 of the terminal A stator coils, the starting terminals 51 of the intermediate stator coils, and the starting terminals 61 of the terminal B stator coils; the second level 72 for the ending terminals 43 of the terminal A stator coils and the ending terminals 53 of the intermediate stator coils; and the third level 73 for the ending terminals 63 of the terminal B stator coils.

In the following description, the terminals 43, 51, 53, and 61 to be connected to the stator coils of the same phase may collectively be referred to as crossover wires 31, and the terminals 41 and 63 to be connected to objects other than the stator coils of the same phase may collectively be referred to as lead wires 32.

The above arrangement of the terminals of the stator coils allows the crossover wires to overlap with each other over the yoke constituting the outer part of the stator iron core in the axial direction of the stator iron core when the stator coils are mounted on the stator iron core from the inside of the stator iron core. Since the terminals of the stator coils are ready for the connection process using a welding machine disposed outside of the stator iron core, additional forming of the stator coils is not necessary.

The above arrangement also allows the lead wires 32 of the stator coils to extend beyond the coil end in the outward direction of the stator iron core when the stator coils are mounted on the stator iron core from the inside of the stator iron core, which reduces the risk of the coil end being damaged during the connection process of the lead wires compared to the connection process over the coil end. When the lead wires are connected to external terminals, the connection process can be performed over the yoke of the stator iron core or outside of the stator iron core, which improves workability. In addition, the above arrangement restricts the height of the rotating electric machine in the axial direction.

The assembly of the stator ASSY 1 with the above structure will be described in detail below. The stator coils are mounted on the stator iron core in the following order: (1) the stator coils having the lead wires closer to the stator iron core than the crossover wires in the axial direction of the stator ASSY; (2) the stator coils having the crossover wires only; and (3) the stator coils having the lead wires remoter from the stator iron core than the crossover wires in the axial direction of the stator ASSY. Specifically, the terminal A stator coils are firstly mounted on the stator iron core, the intermediate stator coils are secondly mounted on the stator iron core, and the terminal B stator coils are thirdly mounted on the stator iron core.

Figure 7:
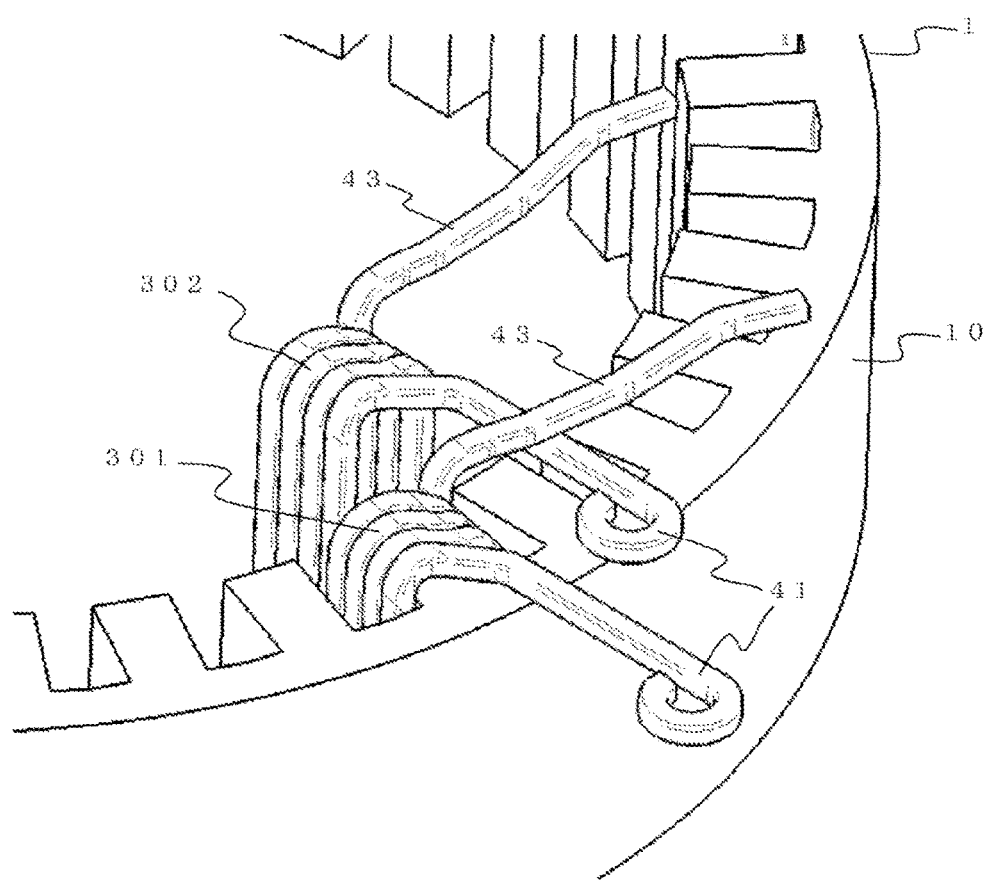
FIG. 7 is a perspective view of the stator ASSY in an assembly process (Embodiment 1).

FIG. 7 illustrates the stator ASSY 1 in the assembly process. In the stator ASSY 1, the terminal A stator coil to be adjacent to a terminal B stator coil is a stator coil 301 that is firstly mounted on the stator iron core. The starting terminal 41 of the stator coil 301 is disposed at the first level 71 and the ending terminal 43 is disposed at the second level 72.

A stator coil 302 is secondly mounted on the stator iron core 10 adjacently to the stator coil 301. Since the stator coil 302 has the starting terminal 41 at the first level 71, the stator coil 302 is mounted on a tooth of the stator iron core while the starting terminal 41 is disposed between the ending terminal 43 of the stator coil 301 at the second level 72, and the stator iron core 10. The ending terminal 43 of the stator coil 302 is disposed at the second level 72 as in the ending terminal 43 of the stator coil 301.

A stator coil 303 is thirdly mounted on the stator iron core adjacently to the stator coil 302. In the same way, a stator coil is mounted on the stator iron core adjacently to the previously mounted stator coil. When the third stator coil is mounted on the stator iron core, the lead wires of the three terminal A stator coils are disposed at the first level 71 in the outward direction of the stator iron core.

The rotating electric machine of this embodiment is a three-phase-current rotating electric machine. If the first stator coil is for a U phase, the second stator coil is for a V phase, and the third stator coil is for a W phase, the third and further stator coils are arranged in a repeated pattern of a U-phase stator coil, a V-phase stator coil, and a W-phase stator coil.

Figure 8:
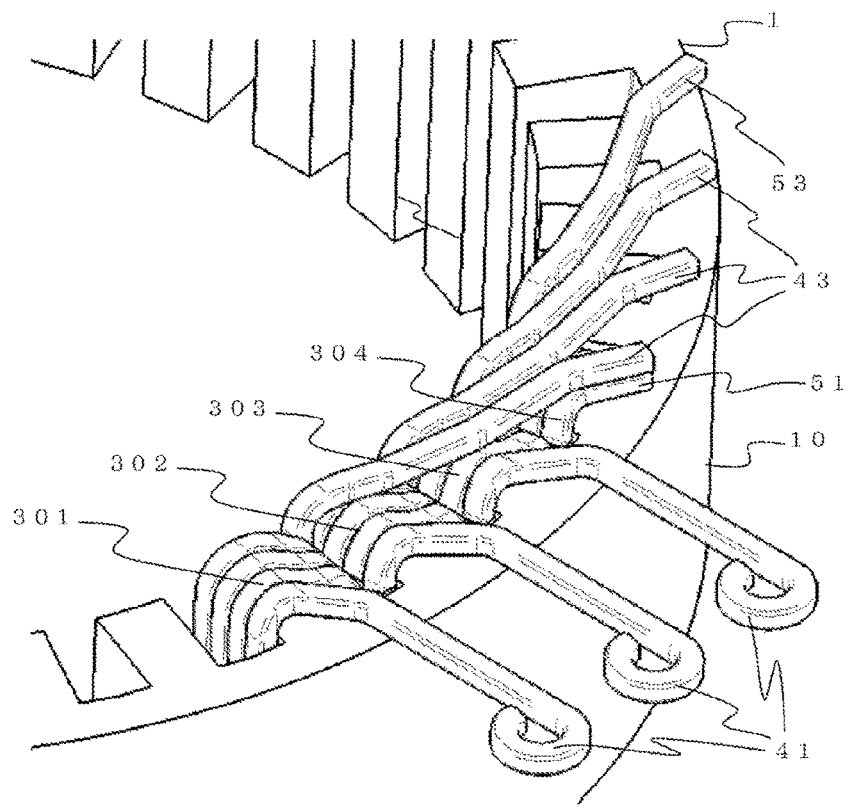
FIG. 8 is a perspective view of the stator ASSY in the assembly process (Embodiment 1).

FIG. 8 illustrates the stator ASSY 1 with the fourth stator coil mounted on the stator iron core. Since the crossover wire of the fourth stator coil 304 and the crossover wire of the stator coil 301 are preformed to overlap with each other in the axial direction of the stator iron core, these crossover wires overlap with each other over the yoke constituting the outer part of the stator iron core in the axial direction of the stator iron core when the stator coils are mounted on the stator iron core.

Figure 9:
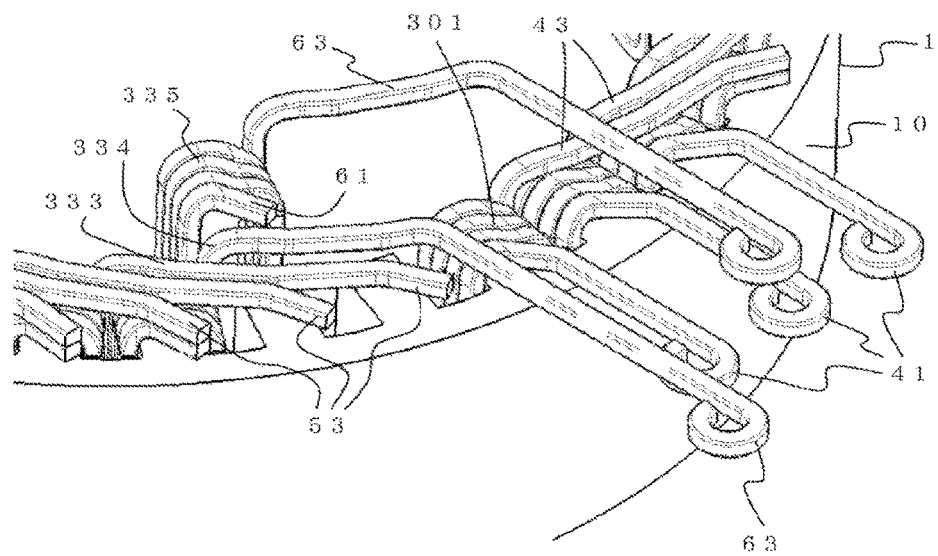
FIG. 9 is a perspective view of the stator ASSY in the assembly process (Embodiment 1).

FIG. 9 illustrate the stator ASSY 1 with the thirty-fifth stator coil being mounted on the stator iron core. The thirty-fourth to thirty-sixth stator coils are the terminal B stator coils 60.

Since the thirty-fifth stator coil 335 has the starting terminal 61 at the first level 71, the stator coil 335 is mounted on the stator iron core while the starting terminal 61 is disposed between the crossover wire of the thirty-third stator coil 333 at the second level and the lead wire of the thirty-fourth stator coil 334 above the second level, and the stator iron core 10.

Since the stator coil 335 has the ending terminal 63 at the third level 73 that is remoter from the stator iron core than the second level 72 for the ending terminal 43 of the stator coil 301 in the axial direction of the stator iron core, the ending terminal 63 is disposed over the ending terminal 43 of the stator coil 301 to extend beyond the coil end of the stator iron core in the outward direction of the stator iron core.

When the thirty-sixth stator coil is mounted on the stator iron core, the lead wires of the three terminal B stator coils are disposed at the third level 73 to extend beyond the coil end of the stator iron core in the outward direction of the stator iron core.

As described above, in the stator ASSY 1 of this embodiment, each of the terminals of the stator coils belongs to one of the three levels. The lead wires of the terminal A stator coils are disposed at the first level 71 and the lead wires of the terminal B stator coils are disposed at the third level 73 while the second level 72 is not used. This arrangement allows the lead wires of the stator coils to be disposed in the outward direction of the stator when all the stator coils are mounted on the teeth, which eliminates the necessity for post-forming of the stator coils.

Since the crossover wires of the stator coils are disposed only at the first level 71 and the second level 72 that are relatively close to the stator iron core, the crossover wires are disposed lower than the lead wires in the axial direction of the stator ASSY 1. Although the lead wires are disposed higher in the axial direction of the stator ASSY 1, they are collectively disposed in one place in the stator ASSY 1, which reduces the size of the rotating electric machine.

Figure 13:
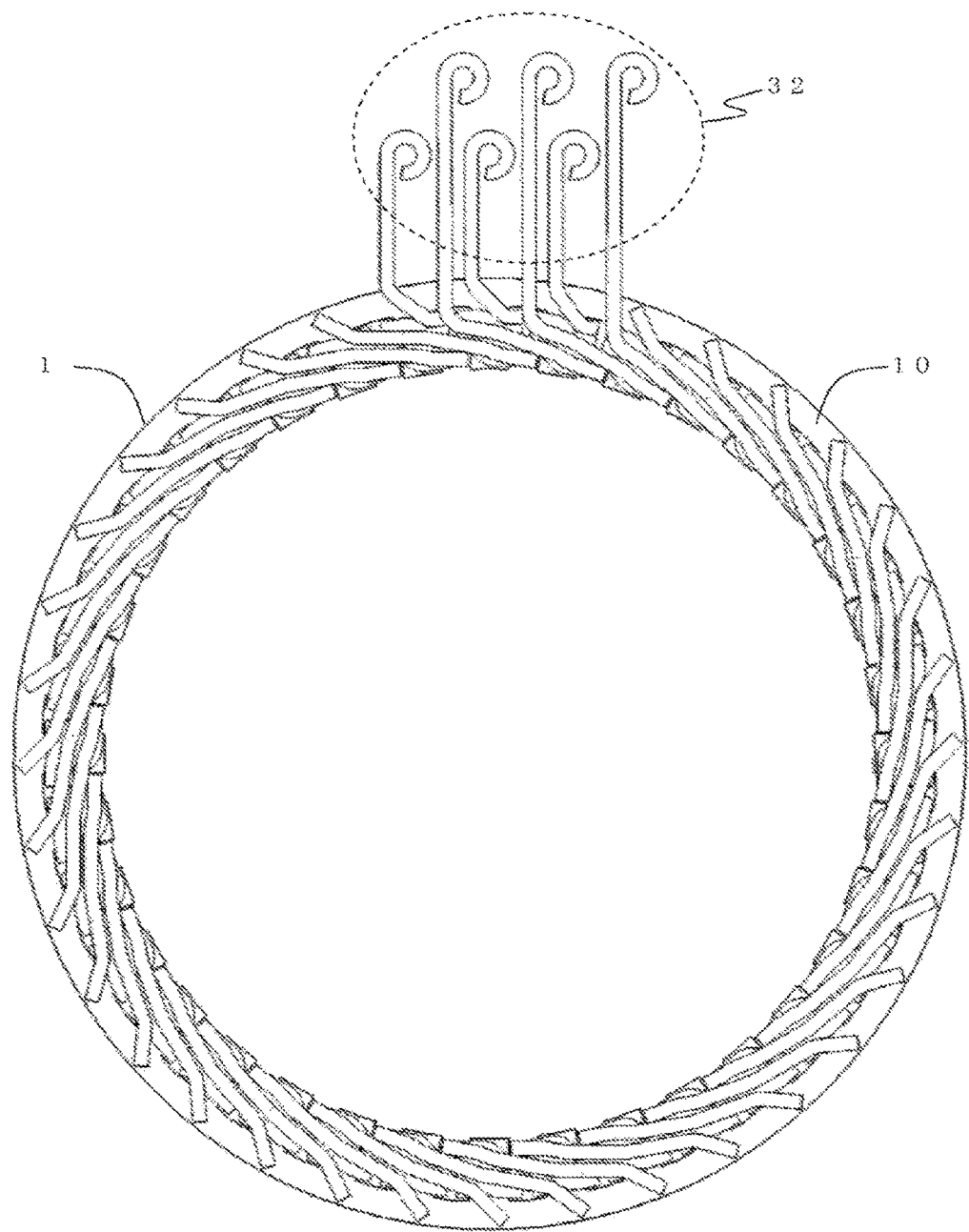
FIG. 13 is a view of the stator ASSY (Embodiment 1).

As illustrated in FIG. 13, in the stator ASSY of this embodiment, the ending crossover wire of a stator coil is disposed close to the central axis of the stator iron core with respect to the ending crossover wire of the previously mounted stator coil, which makes a spiral form of the ending crossover wires of the stator coils from the inner circumference to the outer circumference of the stator iron core in the stator ASSY. Accordingly, when the stator coils are cooled by coolant (such as air or oil), the rotation of a rotor (not shown) allows the coolant to efficiently flow from the inner circumference to the outer circumference of the stator iron core.

Embodiment 2

Figure 10:
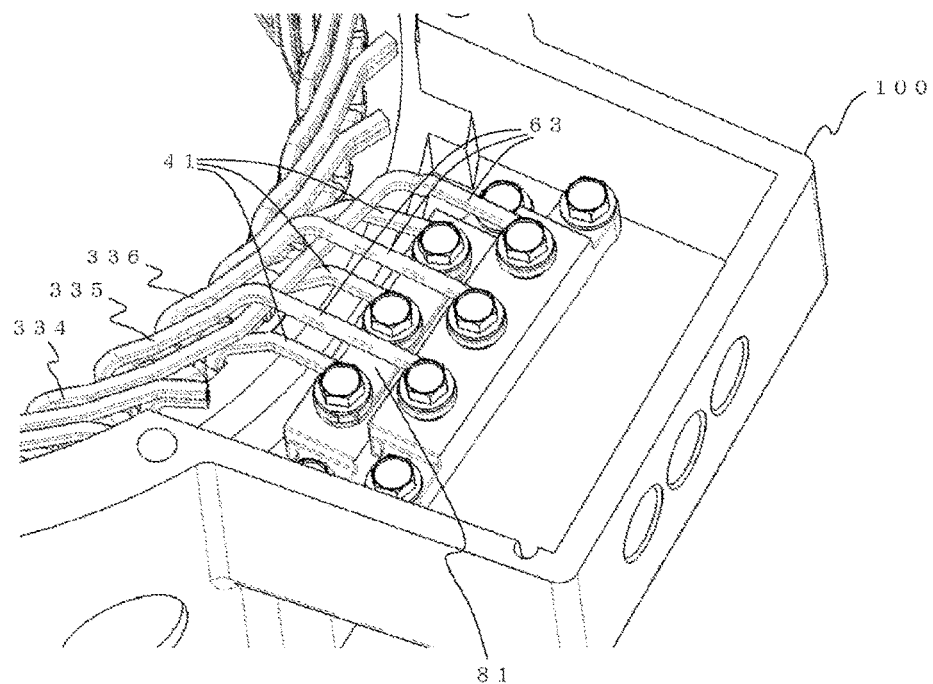
FIG. 10 is a perspective view of a part of the structure (Embodiment 2).

FIG. 10 illustrates the stator ASSY 1 of the present embodiment installed in a housing 100 of a rotating electric machine. All the lead wires of the stator coils are disposed to extend into the housing. The lead wires of the terminal A stator coils are arranged in the order of the U-phase lead wire, the V-phase lead wire, and the W-phase lead wire as in the arrangement of the three stator coils in the order of the U-phase stator coil, the V-phase stator coil, and the W-phase stator coil. The lead wires of the terminal B stator coils are arranged in the order of the V-phase lead wire, the W-phase lead wire, and the U-phase lead wire, different from the arrangement of the stator coils in the order of the U-phase stator coil, the V-phase stator coil, and the W-phase stator coil.

Since the lead wire of the U-phase stator coil 334 is disposed at the third level of the different levels for the terminals of the stator coils, and the lead wires of the V-phase stator coil 335 and the W-phase stator coil 336 are disposed at the fourth level, the lead wires of the stator coils 335 and 336 are disposed over the lead wire of the stator coil 334 in the axial direction of the stator iron core to extend beyond the outer circumference of the stator iron core. The order of the phases of the lead wires of the terminal B stator coils is thus different from the order of the phases of the stator coils.

A rotating electric machine with a Y connection can be assembled by connecting the starting terminal 41 of the U-phase terminal A stator coil, the starting terminal 41 of the V-phase terminal A stator coil, and the starting terminal 41 of the W-phase terminal A stator coil with a connecting board to form a neutral point among the lead wires of the stator coils.

Figure 11:
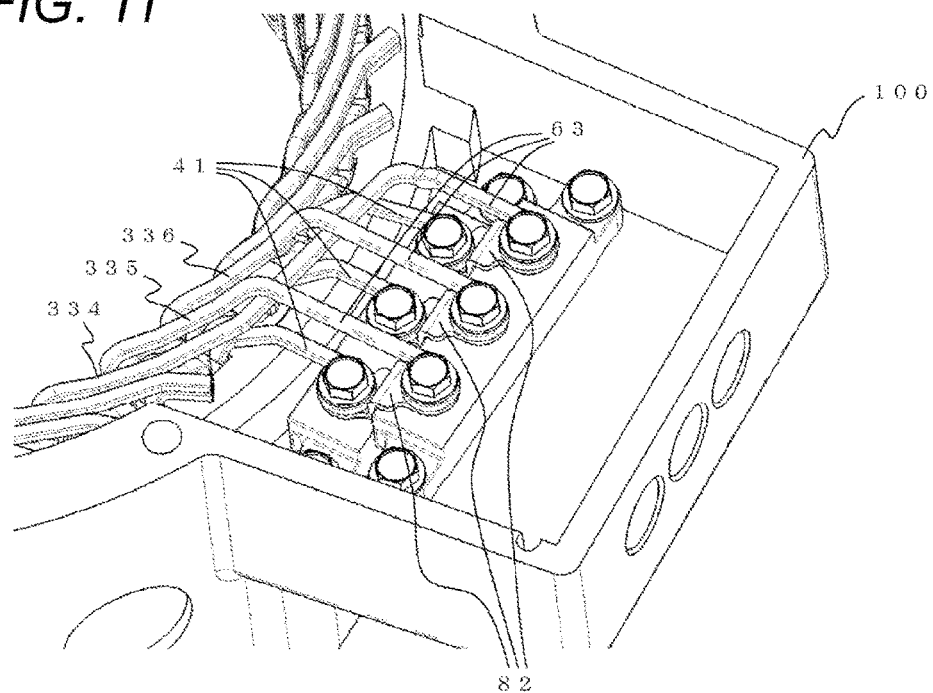
FIG. 11 is a perspective view of a part of the structure (Embodiment 2).

As illustrated in FIG. 11, a rotating electric machine with a Δ connection can be assembled by connecting the starting terminal 41 of the U-phase terminal A stator coil and the ending terminal 63 of the V-phase terminal B stator coil, the starting terminal 41 of the V-phase terminal A stator coil and the ending terminal 63 of the V-phase terminal B stator coil, and the starting terminal 41 of the W-phase terminal A stator coil and the ending terminal 63 of the U-phase terminal B stator coil among the lead wires of the stator coils.

With the stator ASSY of this embodiment, both of a rotating electric machine with a Y connection and a rotating electric machine with a Δ connection can be assembled only by changing the usage of connecting board(s).

As illustrated in FIG. 10, since all the starting terminals of the stator coils are on a level with each other, a Y connection can easily be formed with a low-cost flat connecting board.

As illustrated in FIG. 11, since the order of the phases (a U phase, a V phase, and a W phase) of the lead wires of the terminal A stator coils is different from the order of the phases of the lead wires of the terminal B stator coils, and the lead wires of the terminal A stator coils are alternate with the lead wires of the terminal B stator coils in the axial direction of the stator iron core, a Δ connection can be formed with connecting boards identical in form in the housing of the rotating electric machine.

Modification

Figure 12:
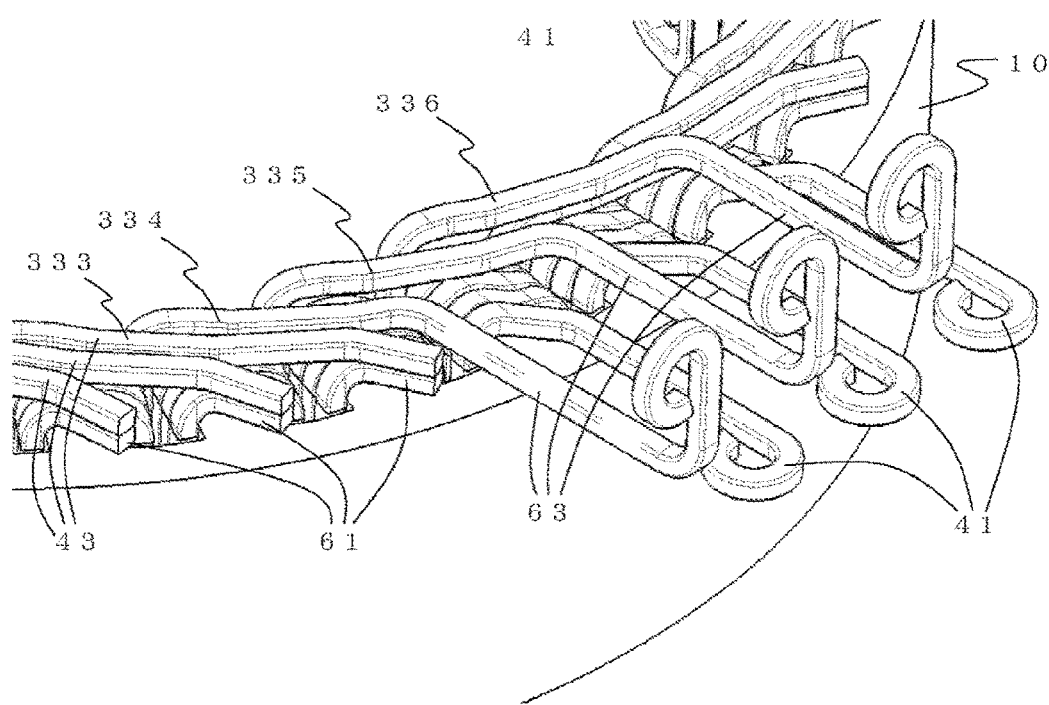
FIG. 12 is a perspective view of a part of a stator ASSY (Modified Embodiment).

FIG. 12 illustrates a modified embodiment of the stator ASSY 1 for a rotating electric machine of the embodiments of the present invention. The terminal B stator coil 334 can be mounted on a tooth of the stator iron core without coming into contact with the stator coils already mounted even if the ending terminal 63 is not disposed at the third level. Therefore, in FIG. 12, the ending terminal 63 is disposed at the second level as in the ending terminal of the intermediate stator coil 333. In addition, the ending terminal 63 of the terminal B stator coil 336 is disposed at the fourth level that is remoter from the stator iron core by one level than the ending terminals of the terminal B stator coils 334 and 335.

In this modified embodiment, there are four levels for the terminals of the stator coils. The ending terminal of the stator coil 335 is disposed at the third level with one level apart from the lead wire of the stator coil 301, and the stator coil 336 is then disposed at the fourth level that is higher than the third level. In this modified embodiment, all the stator coils can be mounted on the stator iron core from the inside of the stator iron core.

In the case of a rotating electric machine with a Y connection having a neutral point formed by the starting terminals of the terminal A stator coils, the ending terminals 63 of the terminal B stator coils are to be connected to external terminals. Depending on the shapes of the external terminals, the heights of the ending terminals may differ from each other or some of the ends of the ending terminals may be directed in the axial direction of the stator iron core. In the first embodiment of the present invention, the ending terminals 63 of the terminal B stator coils are on a level with each other (at the third level 73). Alternatively, the ending terminals 63 may be at different levels from each other.

In the above embodiments, a three-phase-current rotating electric machine is took as an example. Alternatively, a rotating electric machine of the present invention may be of any type.

In the above embodiments, each of the starting terminals 41 of the terminal A stator coils, the starting terminals 51 of the intermediate stator coils, and the starting terminals 61 of the terminal B stator coils is disposed between two virtual lines 70 each of which is drawn from the point of intersection of the side line and the bottom line of one of the adjacent stator coils in the direction of insertion of the terminal A stator coil 40 into a tooth. Alternatively, these starting terminals may be disposed outside of the area between the virtual lines as long as the starting terminals are disposed remoter from the stator iron core than the wound portions.

In the above embodiments, the stator coils are made of rectangular wires. Alternatively, the stator coils may be made of round wires, for example.

In the above embodiments, the ends of the lead wires of the stator coils have circular forms for facilitating the connection with the stator coils of different phases or the connection with external terminals. Alternatively, the ends of the lead wires of the stator coils may have straight forms or be provided with separate connecting members in advance.

The present invention is not limited to the above embodiments and includes various modifications. The above embodiments are provided only for clarifying the present invention and the present invention is not limited to the embodiments including all the structural elements described above.

REFERENCE SIGNS LIST

1 . . . stator ASSY
2 . . . insulating member
3 . . . stator coil
10 . . . stator iron core
31 . . . crossover wire
32 . . . lead wire
40 . . . terminal A stator coil
41 . . . starting terminal of terminal A stator coil
42 . . . wound portion of terminal A stator coil
43 . . . ending terminal of terminal A stator coil
50 . . . intermediate stator coil
51 . . . starting terminal of intermediate stator coil
52 . . . wound portion of intermediate stator coil
53 . . . ending terminal of intermediate stator coil
60 . . . terminal B stator coil
61 . . . starting terminal of terminal B stator coil
62 . . . wound portion of terminal B stator coil
63 . . . ending terminal of terminal B stator coil
70 . . . virtual line
71 . . . first level
72 . . . second level
73 . . . third level
81 . . . connecting board for Y connection
82 . . . connecting board for Δ connection
301 . . . first stator coil
302 . . . second stator coil
303 . . . third stator coil
304 . . . fourth stator coil
333 . . . thirty-third stator coil
334 . . . thirty-fourth stator coil
335 . . . thirty-fifth stator coil
336 . . . thirty-sixth stator coil
500 . . . rotating electric machine
600 . . . rotor

The invention claimed is:

1. A stator comprising:
a stator iron core including a plurality of teeth; and
a plurality of stator coils each being wound on one of the teeth,
wherein the stator coils include terminal stator coils each having a crossover wire and a lead wire, each crossover wire being to be connected to one of the stator coils of a same phase and each lead wire being to be connected to an object other than the stator coils of the same phase,
wherein each end of the crossover wires and the lead wires is disposed at one of different levels in an axial direction of the stator iron core, a first level of the different levels being closest to the stator iron core, and
wherein at least one of the lead wires of the terminal stator coils is disposed at least one level apart from another lead wire within a range of the different levels.

2. The stator according to claim 1,
wherein each end of the crossover wires and the lead wires is disposed at one of three levels in the axial direction of the stator iron core, and
wherein each of the lead wires of the terminal stator coils is disposed at the first level or at a third level of the three levels.

3. The stator according to claim 2,
wherein the stator coils include intermediate stator coils each having two crossover wires, each crossover wire being to be connected to one of the stator coils of the same phase, and
wherein each of the crossover wires of the intermediate stator coils is disposed at the first level or at a second level of the three levels.

4. The stator according to claim 3,
wherein the lead wire or the crossover wire of each stator coil at the first level is disposed between two virtual lines, each of the virtual lines being drawn from a point of intersection of a side line and a bottom line of one of two adjacent stator coils in a direction of insertion of the stator coil into a tooth.

5. The stator according to claim 4,
wherein the lead wires are disposed to extend beyond an outer circumference of the stator iron core.

6. The stator according to claim 5,
wherein the ends of the crossover wires of the terminal stator coils and the ends of the crossover wires of the intermediate stator coils are disposed in an outward direction of the stator iron core.

7. The stator according to claim 6,
wherein the wind-starting lead wires of the terminal stator coils or the wind-ending lead wires of the terminal stator coils are disposed at a same level with each other.

8. The stator according to claim 7,
wherein an order of the phases of the stator coils mounted on the stator iron core is different from the order of the phases of the lead wires disposed in the outward direction of the stator iron core.

9. The stator according to claim 8,
wherein the lead wires of the terminal stator coils at the first level are alternate with the lead wires of the terminal stator coils at a level other than the first level in the axial direction of the stator iron core.

10. A rotating electric machine, comprising:
the stator according to claim 8; and
a rotor disposed inside the stator with a gap.

11. The stator according to claim 6, wherein the wind-starting lead wires of the terminal stator coils and the wind-ending lead wires of the terminal stator coils are disposed at a same level with each other.

12. The stator according to claim 11,
wherein an order of the phases of the stator coils mounted on the stator iron core is different from the order of the phases of the lead wires disposed in the outward direction of the stator iron core.

13. The stator according to claim 12,
wherein the lead wires of the terminal stator coils at the first level are alternate with the lead wires of the terminal stator coils at a level other than the first level in the axial direction of the stator iron core.

* * * * *